2,798,831
COATING PROTECTED ALKALI METAL PRODUCT AND PROCESS

Oswin B. Willcox, Wilmington, Del., assignor to E. I. du Pont de Nemours and Company, Wilmington, Del., a corporation of Delaware No Drawing. Application July 30, 1952, Serial No. 301,790

9 Claims. (Cl. 148—6.14)

This invention relates to the production of alkali metals in a dispersed state and more particularly to sodium as a particulate solid stabilized against rapid deterioration.

Methods for dispersing sodium in inert liquids are well known in the art and have been disclosed in the patent literature as well as other publications. It is well known that sodium can be sub-divided by agitation in hydrocarbon liquids while maintaining the temperature above the melting point of sodium or around 100° C. Dry toluene, xylene, and other anhydrous organic liquids characterized by complete inertness to sodium have been used in the past with good results. Dispersing agents have been added to these systems to assist in obtaining the desired results and in addition stabilizers have been added. The particle size of the dispersed sodium has varied depending on the conditions used in its preparation and has varied in diameter from less than one micron to twenty-five microns or even greater. The dispersed sodium solidifies upon cooling to below the melting point and may be recovered by evaporation of the dispersion medium to effect its separation from its liquid environment.

It is an object of this invention to produce an alkali metal, particularly sodium, in a dispersed state and stabilized against reactivity. A further object is the production of sodium as a coated particulate solid. A still further object is the production of sodium in a solid state suitable for handling by commercial transfer equipment without danger of substantial decomposition in contact with the atmosphere. Further objects will appear as the details of my invention are disclosed.

The above objects are accomplished by a process which comprises dispersing molten sodium (or other alkali metal) as particles or droplets in an anhydrous inert fluid while maintaining the temperature above the melting point of sodium and coating the resulting dispersed sodium by addition of a fluid inorganic substance capable of reacting with the surface portion of the sodium particles to give a binary sodium salt. The reaction taking place between the reactive inorganic substance and the sodium yields a sodium salt which coats the dispersed sodium particle, and, in substance, produces a sphere of sodium surrounded by an inorganic sodium salt while dispersed in the inert fluid. The coated sodium particle may be recovered from the said fluid by methods well known in the art as by separation of the fluid as a gas and we then have a dry solid sodium product which may be moved about as is customary with powders and granular products.

In the preparation of my novel alkali metal product, I first disperse the alkali metal in a fluid medium so as to provide a suspension of particles or droplets of the alkali metal. This operation is best carried out above the melting point of the alkali metal, i. e., above 97.5° C. when using sodium, this being the commercially attractive member of the alkali metal group. Other members of the alkali metal group will produce equally good results and these include lithium, sodium, potassium, rubidium, and cesium, but sodium is the commercially important member of the group due to its wide availability and lower cost. The method of subdividing the molten alkali metal is not critical and one may use devices such as a spray nozzle or a high speed agitator. The former may be the more attractive when the metal is to be dispersed in a gaseous fluid while the latter or an equivalent method may be used when the metal is to be dispersed in a liquid fluid. In illustration of the methods referred to, I might mention the use of compressed argon, nitrogen, or helium for dispersing molten sodium when using a spray gun device, and passing the dispersed sodium into an argon or other inert gaseous atmosphere. Another illustration would be the dropping of a stream of liquid sodium into an organic liquid such as xylene or toluene held at a temperature of around 100° C. and agitating the liquid by a high speed agitator device. The dispersion means should have sufficient force to subdivide the metal to any desired size and usually to give particles which are within the range of from .05 to 2 millimeters in diameter and preferably from about 0.05 to about 1 millimeter diameter.

Tha reactive inorganic substance which gives a salt coating on the alkali metal particle should be a vapor when a gaseous fluid is used for the sodium suspension and appear as a solute when a liquid fluid system is being used. This means that the reactive inorganic reagent is molecularly dispersed in the fluid surrounding the sodium particles when the coating operation is taking place and the film of sodium salt resulting from the reaction builds on the alkali metal particle. It is understood that the fluid may be pure titanium tetrachloride or it may be a gaseous mixture of titanium tetrachloride and an inert gas such as argon or helium. The more dilute system is recommended as there is less danger of too rapid reaction between the alkali metal and the gaseous inorganic reagent. Non-volatile and even inorganic substances of high melting point may also be used provided they have solubility in a suitable fluid, i. e., an organic liquid such as the hydrocarbons or other liquid which are non-reactive with the alkali metal.

While sodium will be used as illustrative of my invention and is considered a commercially attractive member of the alkali metal group, it is understood that the process is applicable to the other members, particularly lithium and potassium as mentioned above, and also to mixtures of the various alkali metals. The coating process may be conducted while the metal is in the form of liquid droplets or after the dispersion has been chilled to below the melting point of the alkali metal.

Many inorganic substances react with sodium to yield sodium salts. The selected reagent should be molecularly dispersible in the fluid being used as the dispersion medium and may be selected from such inorganic substances as titanium tetrachloride, antimony trichloride, antimony pentachloride, chloride of tin, chloride of lead, hydrogen chloride, chlorine, bromine, iodine, ferric chloride, sulphur, aluminum chloride, sulfur monochloride and the like. These compounds or elements when dissolved in the fluid dispersion medium react with the dispersed sodium while the latter is in the liquid or frozen state to give a sodium salt at the interface between the sodium particle and the fluid medium. Other salts may or may not be formed depending upon the nature of the reactive substance selected and this is exemplified by the use of titanium tetrachloride which will give sodium chloride in combination or as a complex with titanium dichloride. Some titanium metal may also appear, but this is not considered an essential of the invention. Similarly, lead chloride will react with sodium to give sodium chloride with some lead entering the sodium to form a sodium lead alloy. Sulphur will react to form sodium sulphide and the free halogens will react to form relatively pure halides of sodium. These sodium compounds are formed at the surface of the sodium particles and we obtain a sodium product enclosed in an envelope of a solid inorganic salt, which we will call, for the sake of simplicity, binary sodium salts, even though there may be some evidence of complex formation as when titanium tetrachloride is used and as mentioned above. It is obvious that a much larger group of reactive substances than those specifically mentioned above may be used as by substitution of other halogens for chlorine as in titanium tetrabromide, titanium tetraiodide, etc. It is evident that the reactive inorganic substance should be either vaporizable or soluble in the organic liquid in which the sodium dispersion is to be made when this mode of operation has been chosen and may be selected from the reactive non-metallic elements such as the halogens and sulphur as well as the salts of metals which are below sodium in the electromotive force series of the elements.

The organic dispersing medium may be selected from a large number of organic substances as illustrated by the following:

| | |
|---|---|
| Petroleum jelly | Cetane |
| Sodium purified naphthalene | Toluene |
| Tetralin | Dimethoxy decane |
| Dodecene | Fuel oil |
| Deobase kerosene | Mineral oil |
| Heptane | Xylene |

It is evident that these media are characterized by inertness to sodium and many of them are hydrocarbons, xylene being a very interesting one when the sodium is to be recovered as a coated particulate solid. Compounds such as alcohols and ketones are not included due to their reactivity with sodium. Ethers such as dimethoxy decane may be used as an oxygen-containing organic compound inert in contact with the dispersed alkali metal. It is thus seen that the process being disclosed herein is subject to wide variation in the selection of the inert fluid-dispersing medium and the reactive substance yielding the inorganic sodium salt which encloses or coats the particles of sodium. The inorganic sodium salts produced are insoluble in the inert fluid medium and this leads to the encasement of the sodium particles.

The more attractive organic liquids boil above the melting point of sodium, but the process may be operated while maintaining a low-boiling organic solvent in the liquid state by the use of pressure during the time the molten sodium is being dispersed therein. This may have certain advantages when recovering the coated sodium from the organic medium due to the low boiling point of the organic medium and this may in some instances more than neutralize the added difficulty in operating this system under pressure while dispersing the molten sodium therein.

In my process for the preparation of this improved solid particulate product, a portion of the sodium, say, from 2.5 to 20%, is consumed in the formation of the insoluble sodium salt crust or envelope which serves to protect the particles when they are removed from the inert fluid in which they are prepared and in which they are insoluble. The inorganic reagent, i. e., reactive non-metallic elements, compounds consisting of reactive non-metallic elements such as a chloride of sulphur and salts of metals reducible by sodium, is reacted with the dispersed sodium in the amount chemically equivalent to 2.5-20% of the dispersed sodium and the protective coating develops on the metal particle. The coated product may be easily separated from the inert fluid by conventional means as by use of settling, evaporating, filtering, or centrifuging techniques.

My invention will be illustrated by examples wherein the dispersed sodium is coated with sodium chloride while suspended in xylene and in an inert gaseous fluid, but it is understood that the invention is not limited thereto and is capable of many modifications as mentioned above.

Example I 700 cc. of dehydrated xylene prepared by a preliminary treatment with sodium was placed in a closed kettle equipped with a high-speed agitator blade, a reflux condenser, and an inlet for introducing the sodium and the coating reagent. Sixty grams of sodium were introduced into the kettle which was heated until the sodium melted and the boiling point of xylene was reached. The agitator was then started and continued for twenty minutes, during which time the sodium became dispersed in the xylene. Titanium tetrachloride was introduced as a vapor over a twelve-minute period with continued agitation or until about 24 grams of this reagent was added with continued agitation. The chloride of titanium and xylene upon mixing formed a yellow complex which reacted rapidly with the sodium releasing pure xylene. The latter was otherwise considered as inert and the reaction and the amount of each of the other reagents in the system is represented by the following reaction:

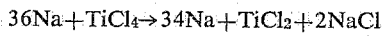

$$36Na + TiCl_4 \rightarrow 34Na + TiCl_2 + 2NaCl$$

The result of the above operation was a black slurry. This slurry was cooled, allowed to settle, and the clear xylene removed by decantation. The sludge was dried by passage of a stream of argon at 90° C. to evaporate the xylene. The product had the appearance of a fine, free-flowing dry black sand and microscopic examination showed it to consist of sodium spheres having a diameter of from ½ to 1 mm. and enclosed in a thin, dark salt layer. The latter was believed to be sodium chloride and to contain substantial amounts of a lower chloride of titanium, probably titanium dichloride.

Example II

The procedure of Example I was repeated, except for the inorganic reagent, using the same apparatus and an equal amount of xylene which had been carefully prepared following the precaution stated above. About 60 grams of sodium was likewise introduced into the kettle and dispersion effected by heating to above the melting temperature of sodium with the aid of agitation. Gaseous chlorine was introduced with continued agitation and continued until about 9 grams of chlorine had been admitted to the system. Reaction occurred between the chlorine and the sodium and again particles of sodium, coated by sodium chloride, were obtained. The product in this instance was fine, free-flowing dry white sand and microscopic examinations showed the product to consist of sodium spheres averaging slightly under 1 mm. in diameter and covered by a thin layer of sodium chloride.

Example III

Sodium was atomized into the top of a nitrogen-filled tower 100 ft. high and 3 ft. in diameter, by using a stream of compressed nitrogen to atomize the sodium which was held at a temperature of 110° C. Chlorine was fed into the tower at a point 10 ft. below the top at a rate of 1 lb. of chlorine for each 10 lbs. of sodium admitted through the atomizing equipment. The subdivided sodium fell through the chlorine-containing nitrogen to the bottom of the tower and was collected as sodium chloride-coated sodium particles and having a granular appearance.

Xylene was used in the first two examples as it is ideally suited for experimental production of the coated particulate sodium product due to the fact that it is normally liquid at the melting temperature of sodium and may be evaporated from the final product at a temperature below the melting point of sodium due to its favorable vapor pressure characteristics. A hydrocarbon, such as hexane which boils below the melting point of sodium, may also be used if a pressure vessel is used during the dispersing operation. The coating portion of the operation may be effected either before or after lowering the temperature as it is not critical to carry out the salt coating operation while the sodium is in the liquid state. One may elect to operate the system under widely different conditions as long as sodium is first dispersed (while suspended within the non-reactive fluid) and then coated by reaction with the inorganic reagent.

The alkali metal may be subdivided in one medium and coated in another. However, the most convenient method and probably the most readily controlled procedure involves the diluting of the reacting substance in an inert fluid which has previously been used to disperse the sodium.

In certain instances it may be desirable to do the coating reaction in a concentrated or even pure medium. In these cases the extent of the coating would be limited by one of several methods: (a) auto-inhibition due to the formation of a completely impenetrable coating under the reaction conditions, (b) operation at low temperature, or (c) rapid removal of the coated product from the reaction medium.

The sodium product of my invention has been referred to as coated particulate sodium as it is essentially composed of spheres of sodium encased in a sodium salt, usually a halide of sodium although sulfides, selenides and tellurides are considered within the scope of the invention. The dispersed sodium product may be used for the carrying out of organic reactions or the reduction of compounds while it remains suspended in the organic medium or it may be used as a solid reagent after separation from the organic medium. It will serve in many of the reactions in which sodium is now used, and it is quite possible that the selection of the coating reagent to be used will be determined by the end-use of the sodium product. For example, the presence of a metal, such as titanium, antimony or lead, may be injurious in certain compounds and, in such instance, one may elect to use a product such as produced in Examples II and III above, wherein the product contains only sodium and sodium chloride. In other instances, it may be desirable to use the product of Example I which is sodium coated with a stable complex of sodium chloride and titanium dichloride. This coating has chemical reducing power and may be beneficial in certain uses of the sodium product.

I claim as my invention:

1. As an article of manufacture, particulate alkali metal encased in a protective surface coating comprising a metal salt layer chemically bonded to said alkali metal.

2. As an article of manufacture, coated particulate alkali metal, said particulates being substantially spherical in shape and encased in a protective surface layer of an alkali metal salt chemically bonded to said alkali metal.

3. A process for the production of an alkali metal in coated particulate form and stabilized against rapid deterioration which comprises dispersing molten alkali metal in an inert fluid and reacting the surface of the subdivided alkali metal with an inorganic reactant to form thereover and encase said particulate alkali metal in a protective alkali metal salt coating.

4. A process for the production of an alkali metal in coated particulate form and stabilized against rapid deterioration which comprises dispersing said alkali metal in molten form in an inert fluid containing a molecularly dispersed inorganic substance capable of reacting with the surface portion of said alkali metal to give a binary alkali metal salt which is solid and insoluble in the fluid medium in which it is prepared and forms a solid encasing coating over the dispersed particles of alkali metal.

5. A process for the preparation of an alkali metal in coated particulate form and stabilized against rapid deterioration which comprises subdividing the alkali metal in an inert fluid while the alkali metal is above its melting point, and reacting the subdivided alkali metal with a reactive inorganic substance to form a solid, encasing coating of an alkali metal salt on the surfaces of said alkali metal particles.

6. A process for the preparation of an alkali metal in coated particulate form and stabilized against rapid deterioration which comprises subdividing the alkali metal in an inert organic liquid while the alkali metal is above its melting point and reacting the subdivided alkali metal with a reactive inorganic substance dissolved in the organic liquid, thereby forming a solid, encasing coating of an alkali metal salt on the surface of the subdivided alkali metal particles.

7. A process for the preparation of an alkali metal in coated particulate form and stabilized against rapid deterioration which comprises dispersing a molten alkali metal in an inert organic liquid, dissolving in the resulting suspension an inorganic substance reactive with the alkali metal, thereby forming a solid, encasing coating of the alkali metal salt on the surface of the dispersed alkali metal particles.

8. A process for the preparation of an alkali metal in subdivided form and stabilized against rapid deterioration by being coated with a chloride salt of the alkali metal which comprises subdividing the alkali metal while in molten condition in an inert organic liquid, chilling the resulting suspension to below the melting point of the alkali metal and adding to the suspension of solid alkali metal particles in the organic liquid a reactive chlorine-containing inorganic substance, thereby forming an encasing alkali metal chloride coating on the surface of the subdivided alkali metal particles.

9. A process for the preparation of sodium in coated particulate form and stabilized against rapid deterioration which comprises adding sodium to an organic liquid, inert to sodium, while maintaining said liquid at above the melting temperature of sodium, subdividing the molten sodium to form a suspension therein by mechanical means and coating the sodium particles by addition thereto of a reactive inorganic salt soluble in the organic liquid, thereby forming by reaction with the sodium particles a solid encasing coating of a sodium salt on the surface of the suspended sodium particles.

References Cited in the file of this patent

UNITED STATES PATENTS

| | | |
|---|---|---|
| 1,669,644 | Andrews | May 15, 1928 |
| 2,143,959 | Schumpelt | Jan. 17, 1939 |
| 2,169,732 | Legg | Aug. 15, 1939 |
| 2,252,876 | Woodford | Aug. 19, 1941 |
| 2,280,703 | Hart | Apr. 21, 1942 |
| 2,306,198 | Verweij et al. | Dec. 22, 1942 |
| 2,483,887 | Crouch | Oct. 4, 1949 |
| 2,513,302 | Feild | July 4, 1950 |
| 2,513,303 | Feild | July 4, 1950 |
| 2,574,357 | Stammer | Nov. 6, 1951 |